July 15, 1941.  W. THOMPSON  2,249,405
VEHICLE BRAKE
Filed July 2, 1940
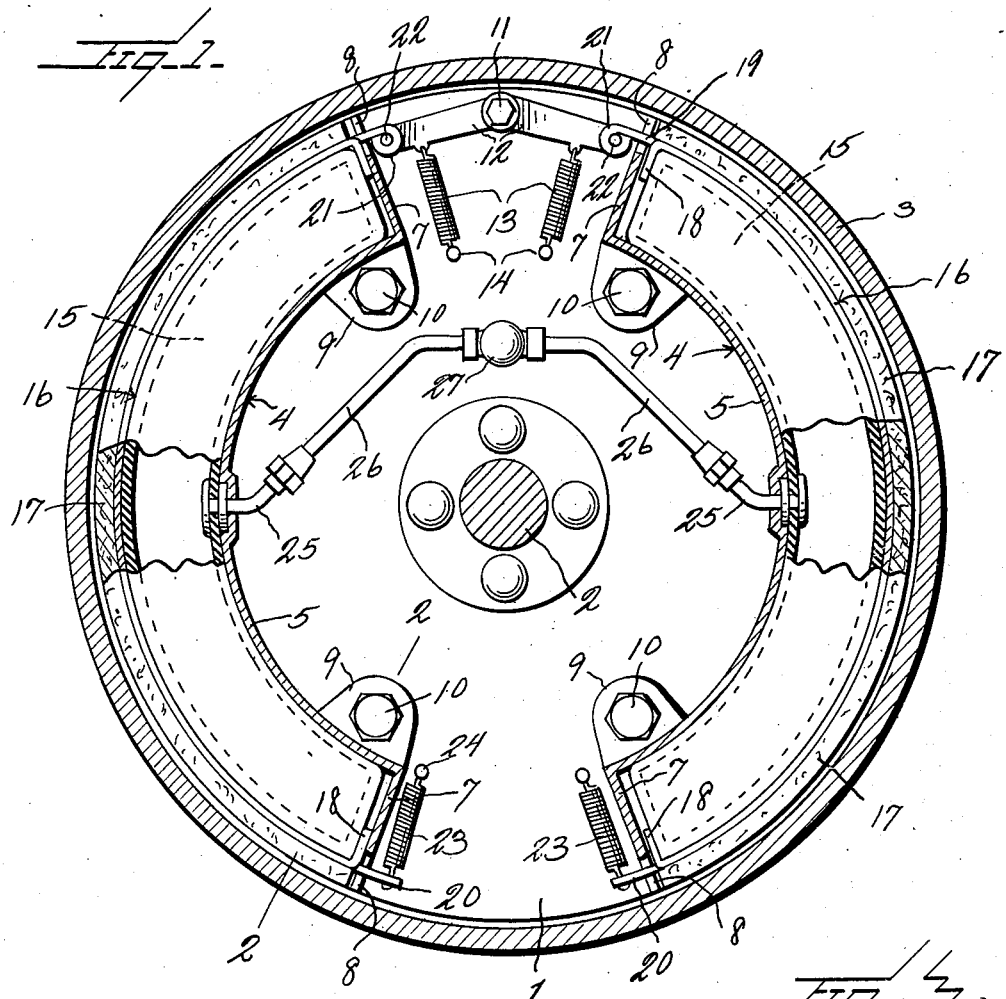
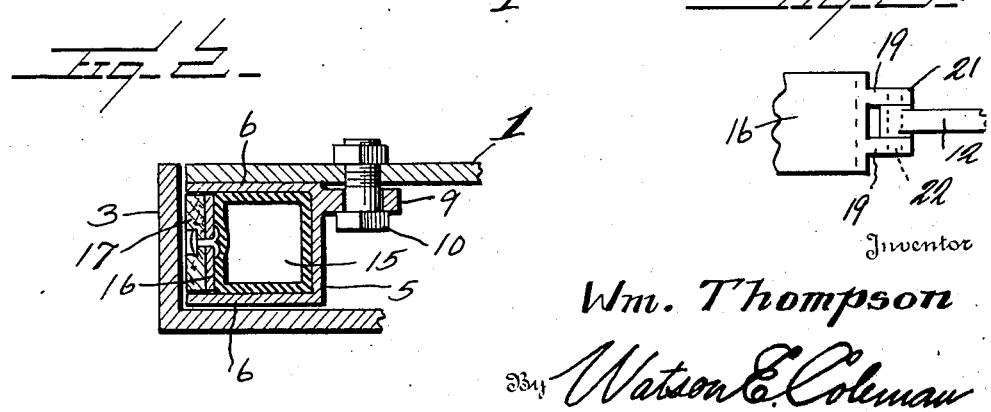
Inventor
Wm. Thompson
By Watson E. Coleman
Attorney Patented July 15, 1941

2,249,405

UNITED STATES PATENT OFFICE 2,249,405

VEHICLE BRAKE

William Thompson, Pontiac, Mich., assignor of one-half to Lawson D. Smith, Pontiac, Mich.

Application July 2, 1940, Serial No. 343,654

4 Claims. (Cl. 188—152)

This invention relates generally to the class of brakes and pertains particularly to improvements in vehicle wheel brakes.

The primary object of the present invention is to provide an improved air actuated brake which is so designed that when the air pressure is set up or established for the applying of the brake, the shoes of the brake will contact the brake drum with an equalized pressure, thereby obtaining full braking contact between the friction bands carried by the brake shoes and the friction drum with which the bands come into contact.

Another object of the invention is to provide a brake having air actuated shoes in which the shoes and the air chambers adjacent thereto are so related that the shoes will be forced to conform to the curvature or contour of the drum with which the friction elements of the brake engage so that the full braking contact of the friction elements with the drum will be obtained even though the drum face is unsymmetrical as a result of wear or for any other reason.

A further object of the invention is to provide an improved brake structure in which the movable parts are few in number and are so constructed and arranged as to receive a minimum of wear, thus insuring a long life for the brake mechanism.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view partly in elevation and partly in section of the brake structure embodying the present invention, looking toward the axle flange upon which the brake is mounted and showing the surrounding brake drum in section.

Fig. 2 is a sectional view on the line 2—2 of Fig. 1.

Fig. 3 is a detailed fragmentary view showing the coupling between an end of a shoe and a spreader or equalizing arm.

Referring now more particularly to the drawing, the numeral 1 designates the usual axle plate upon which the brake structure is mounted. This plate is secured to and concentrically with the vehicle axle which is indicated at 2. The numeral 3 designates the brake drum which is cut through in a plane perpendicular to its axis and which, of course, is carried upon the vehicle wheel, not shown.

In accordance with the present invention, there are provided the two arcuate housings 4 which are disposed against the outer face of the axle plate 1 with their concave sides in opposed relation and arranged concentric with the axle 2. The adjacent ends of the housings 4 are in spaced relation as shown, these spaces being at the top and the bottom of the brake mechanism. Each housing has an inner or back wall 5, the two radially extending side walls 6 and the end walls 7 which connect with the side walls and the back wall to close the ends of the housing. Each of the end walls 7 has an edge slot 8 therein, the purpose of which will be hereinafter described.

Integral with each of the housings and adjacent the side wall which lies nearest the plate 1, is a pair of ears 9 which extend inwardly across the adjacent back wall 5, and these ears are secured by bolts 10 to the plate 1. Thus the housings 4 are arranged in fixed relation with respect to one another and are secured to the axle plate 1 against movement.

At the top of the brake mechanism the axle plate 1 carries a stud bolt 11 which is disposed substantially midway between the two adjacent housing ends and to this bolt are attached the two spreader or equalizing arms 12 which extend in opposite directions each toward an end wall 7. To the inner side of each of the arms 12 is attached an end of a contractile spring 13, the other end of each spring being attached, as at 14, to the axle plate. These springs extend substantially radially of the plate from the arms 12 and normally urge the arms to swing inwardly.

Within each housing 4 is an elongated arcuate air cell 15 formed of rubber or a suitable stretchable or expansible material. Each of these cells has a width substantially equal to the interior width of the housing in which it is disposed and a length substantially equal to the length of the housing. The height or thickness of the cell is less than the height of the housing in which it is disposed and extending longitudinally of the outer or radial face of each air cell is a brake shoe plate or strip 16 to the outer face of which is fixed the lining or friction material 17. Each shoe 16 is of relatively thin flexible metal and, of course, has a width substantially equal to the interior width of the housing 4 in which it lies.

At each end each shoe has an inturned lip 18 which extends across the adjacent end of the air cell against which the shoe lies. In addition, each shoe has at the end thereof which is adjacent to the arms 12, the pair of circumferentially extending spaced fingers 19 and at the other end the single circumferentially extending finger 20. The fingers 19 terminate in alined hinge knuckles 21 between which the free end of the adjacent arm 12 positions and such arm is pivotally connected with the knuckles 12 by a pivot pin 22. The fingers 19 extend through the slots 8 in the adjacent housing end walls 7. The single finger 20 at the opposite or lower end of each shoe 16 also extends through the slot 20 of the adjacent housing end wall and each of these single fingers has attached thereto an end of a contractile spring 23, the other end of which is connected, as at 24, to the plate 1. These latter springs are like the springs 13, arranged to extend radially inwardly with respect to the brake mechanism.

The outer or wear surface of the friction lining 17 of each brake shoe lies substantially in the plane of the edges of the walls 6 of the adjacent housing, and this surface is extended beyond such wall edges and beyond the periphery of the plate 1 for contact with the inner surface of the drum 3 when the air cells are expanded by the introduction thereinto of a suitable fluid under pressure such as air.

In order to facilitate the introduction of the expanding fluid such as air into the cells, each cell is provided with a coupling tube 25 which passes through the back wall 5 of the housing in which the cell is located and these tubes are connected by pipes 26 with a supply pipe, the end of which is indicated at 27 and which extends through the plate 1 from a suitable pressure supply source. When the fluid under pressure is introduced into the pipes 26, it will fill and expand the cells 15 equally and since the side, back and end walls of the enclosing housing contact the adjacent walls of the cell, the cell can only increase in size in one direction, which is radially of the mechanism and, therefore, it will force the brake shoes outwardly to bring the lining into contact with the brake drum 3 as described. When this action occurs, the fingers 19 and 20 will, of course, move outwardly and thus elongate or stretch the springs 13 and 23 attached thereto. When the fluid pressure is released or exhausted from the cells, these springs will function in cooperation with the natural tendency of the expansible cell material to return to its previous condition, to pull the brake shoes away from the drum, thus releasing the brakes. The coupled pivoted arms 12 which are attached to the end of the shoes function to prevent any circumferential movement of the shoes and the air cells with respect to the fixed housings 4.

From the foregoing, it will be readily apparent that since the shoes 16 which carry the friction lining are of thin resilient metal, they will be made, together with the friction lining, to conform to the curvature of the inner surface of the drum and will fill out any inequalities in the drum surface which may have developed as a result of wear or which might be present in the drum as initially formed. By this means, a firm contact will be established between the drum and the brake material throughout the entire surface of the latter so that maximum braking action will be obtained.

It will also be readily recognized that there is a minimum of moving parts and consequently the possibility of failure of the brake as a result of wear or breakage of any parts is reduced to a minimum and the life of the brake is materially increased.

What is claimed is:

1. A brake structure, comprising in association with an axle carried plate, a pair of arcuate housings secured against one face of said plate, the housings having their convex sides in opposed relation and being disposed concentric with the axle, said housings being open only upon their convex sides, an arcuate fluid cell disposed within each housing, said cell being of substantially the same length as the interior of its housing, a brake shoe of arcuate form disposed in each housing adjacent the open side thereof and against the outer side of the cell, a brake lining strip carried by each shoe, means facilitating the introduction of fluid under pressure into each cell for expanding the latter, and spring means coupling both ends of each of said shoes with said plate and exerting a holding action in a radial direction on each shoe and the adjacent cell.

2. A brake structure, comprising in association with an axle carried plate, a pair of arcuate housings secured against one face of said plate, the housings having their convex sides in opposed relation and being disposed concentric with the axle, said housings being open upon only their convex sides, an arcuate fluid cell disposed within each housing, said cell being of substantially the same length as the interior of its housing, a brake shoe of arcuate form disposed in each housing adjacent the open side thereof and against the outer side of the cell, a brake lining strip carried by each shoe, means facilitating the introduction of fluid under pressure into each cell for expanding the latter, said housings having their ends in spaced relation one with the other, a finger extending from each end of each shoe in the direction of the circumference of the circle defined by the housings, a pair of arm members pivotally attached to said plate on a common pivotal center and between two adjacent housing ends, each of said arm members being pivotally attached to a finger of an adjacent shoe, spring means coupling said arm members with the plate and normally urging the remote ends of the arm members to oscillate toward the axial center of the plate, and spring members connected between the fingers at the other two adjacent housing ends and said plate and normally resisting movement of the shoes radially outwardly.

3. A brake structure, comprising in association with an axle carried plate, a pair of arcuate housings secured in end opposed relation to the plate and concentric with the axle, said housings being open upon their outer convex sides, an arcuate fluid cell disposed within each housing and extending through the length thereof, a brake shoe of arcuate form disposed within the open side of each housing and against the outer side of the adjacent cell, each of said shoes having an inturned end portion extending into the housing between the adjacent end of the cell and the adjacent end wall of the housing, a brake lining strip secured to the outer convex side of each shoe, a finger extending from each end of each shoe in the direction of the circumference of the circle defined by the housings and beyond the adjacent end wall of the housing, a contractile spring adjacent each of said fingers and extending radially of the plate and having one end secured to the plate, coupling means between the other end of each spring and the adjacent finger, and means for introducing fluid under pressure into each cell for expanding the latter.

4. A brake structure, comprising in association with an axle carried plate, a pair of arcuate housings secured in end opposed relation to the plate and concentric with the axle, said housings being open upon their outer convex sides, an arcuate fluid cell disposed within each housing and extending through the length thereof, a brake shoe of arcuate form disposed within the open side of each housing and against the outer side of the adjacent cell, each of said shoes having an inturned end portion extending into the housing between the adjacent end of the cell and the adjacent end wall of the housing, a brake lining strip secured to the outer convex side of each shoe, a finger extending from each end of each shoe in the direction of the circumference of the circle defined by the housings and beyond the adjacent end wall of the housing, a contractile spring adjacent each of said fingers and extending radially of the plate and having one end secured to the plate, coupling means between the other end of each spring and the adjacent finger, means for introducing fluid under pressure into each cell for expanding the latter, a pair of arms each secured to one of a pair of adjacent fingers, and a pivot member secured to the plate and disposed centrally between the pair of fingers to which said arms are attached and having the other ends of said arms pivotally coupled therewith.

WILLIAM THOMPSON.